Figure 1:
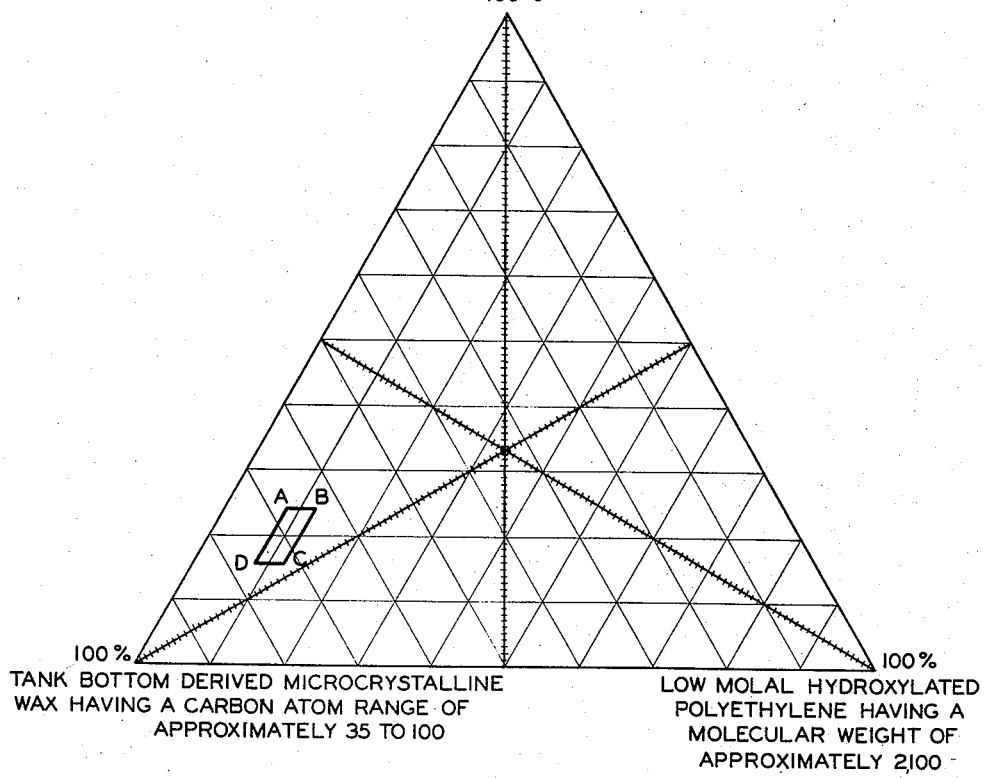

United States Patent Office

2,879,237
Patented Mar. 24, 1959

2,879,237

PROCESS OF OXIDIZING MIXTURE OF MICROCRYSTALLINE WAX, HYDROXYLATED POLYETHYLENE AND POLYETHYLENE, AND PRODUCT PRODUCED THEREBY

Melvin De Groote, University City, and Franklin E. Mange, Clayton, Mo., assignors to Petrolite Corporation, Wilmington, Del., a corporation of Delaware Application March 10, 1955, Serial No. 493,461

8 Claims. (Cl. 260—28.5)

The present invention is a continuation-in-part of our co-pending applications, Serial No. 418,381, filed March 24, 1954, now abandoned. See also our co-pending applications, Serial Nos. 493,462, and 493,463, both filed March 10, 1055. See also copending application Serial No. 493,561, 493,562, and 493,563, each filed on March 10, 1955, of Malcolm E. Bolton assigned to the same assignee as is this application, now abandoned.

The present invention is concerned with a process of oxidizing a three-component mixture consisting of (A) refined tank bottom-derived microcrystalline wax having a carbon atom range of approximately 35 to 100; said wax being characterized by the following characteristics; (aa) oxidation susceptible in conventional gaseous oxygen-containing oxidation procedure; (bb) immiscible with polystyrene of molecular weight range 5,000 to 10,000 at approximately 160° C., and (cc) has not been rendered oxidation susceptible by subjecting to treatment with a member of the class consisting of a metallic halide, hydrochloric acid and chlorinated hydrocarbon; (B) a low molal polyethylene having a molecular weight of approximately 2100; said polyethylene having a terminal hydroxyl group, said hydroxylated polyethylene being produced by polymerizing ethylene under 425-475 atmospheres at temperatures between 140° and 200° C. in the presence of isopropanol and hydrogen peroxide; and (C) a normal commercial polyethylene defined by the small shaded rectangular band of Figure 4; in such weight proportions so that the average composition of said initial reactants lies approximately within the parallelogram A, B, C, D, of the accompanying drawing, Figure 1; said oxidation comprising treatment with an oxygen-containing gas in presence of not over 2% of a conventional oxidation-promoting catalyst at a temperature sufficiently above the boiling point of water for a period of time in gas flow rate to cause formation of (a) hydroxyl containing molecules; (b) carboxyl containing molecules; followed by (c) esterification, and (d) subsequent reactions including at least one of the following, alcoholysis and ester-interchange; said resultant product having an acid number of not less than 12, and a saponification number of not less than 35, and having a combined oxygen content of not less than 2%.

A variety of hydrocarbon waxes and comparable compounds principally hydrocarbon in nature have been subjected to oxidation in various manners and particularly by the use of air, ozone, or oxygen in the presence of an oxidation catalyst, such as a wax soluble organic salt, such as manganese or cobalt naphthenate.

The waxes employed for oxidation may be obtained by various procedures; for instance, they may be obtained in processes involving the production of lubricating oil, or in processes conducted primarily for the recovery of wax; or they may be obtained from sediment in crude oil itself, i.e., commonly referred to as "tank bottoms."

The present invention is limited to a combination employing (a) a specific type of microcrystalline wax derived from tank bottoms as differentiated from the broad class, (b) conventional high molal polyethylene having a molecular weight in the range of 12,000 to 32,000, and (c) a certain type of low molal hydroxy polyethylene having a molecular weight of approximately 2000.

The recovery and production of microcrystalline wax is well known and has been described in the literature. See, for example, U.S. Patent No. 2,443,840, dated June 22, 1948, to Stossel.

Recovery of tank bottom waxes is conducted principally in the middle western oil fields, in Kansas, Oklahoma, Louisiana, and Texas as well as elsewhere to a lesser degree. The difference in tank bottom waxes can be illustrated by reference to those found in a single State, to wit, Texas. The composition of tank bottom waxes has been approximately determined. In each instance the tank bottom wax is a mixture principally of hydrocarbon material containing a perhaps a trace of some other element in chemical combination, not infrequently oxygen, and sometimes nitrogen and sulphur. Although there usually is only a trace of elements other than carbon and hydrogen yet such trace in combination with a molecule having 35 to 100 carbon atoms may actually have significance which is somewhat obscure and subtle.

Although the tank bottom waxes are largely paraffinic in nature one cannot necessarily rule out the fact that a molecule having 35 to 100 carbon atoms may or may not have some other structure such as an aryl structure or more likely an alicyclic structure.

Even in light of what has been said previously there is no explanation for a fact that has been recognized for years, to wit, that microcrystalline waxes, and for that matter one could limit oneself to those found in Texas, fall into two classes; one class consists of oxidation susceptible microcrystalline waxes which can be oxidized readily using a conventional catalyst and using a well known procedure such as the kind described in the article entitled "Oxidation of Paraffins," by Dr. Ernest Stossel, which appeared in the Oil and Gas Journal, issues of July 21, August 18, and September 1, 1945. The other class of microcrystalline waxes appears to be identical in most respects but for some reason these are not oxidation susceptible waxes and for some purposes perhaps even more valuable.

Purely for purpose of illustration, immediately following and identified as Table I, is a table showing oxidation of the West Texas microcrystalline wax (non-oxidation susceptible), the oxidation of an East Texas microcrystalline wax (oxidation susceptible), and the oxidation of an aluminum chloride treated West Texas microcrystalline wax, all three waxes being oxidized under the same conditions.

TABLE I

| | Duration of Oxidation, hours | Temperature, ° F. | Acid No. of Product |
|---|---|---|---|
| East Texas Wax | 16 | 330 | 31.6 |
| West Texas Wax | 24 | 330 | 1.9 |
| West Texas Wax (aluminum chloride treated) | 8 | 330 | 26.1 |

As has been pointed out elsewhere, one can select two different microcrystalline waxes, both obtained from tank bottoms and both possibly obtained from the same state, for instance, from various Texas oil fields which are characterized by substantially the same physical properties by conventional measurements. However, from the standpoint of oxidation susceptibility by means of gaseous oxidation it is found that one class is non-susceptible and the other one is susceptible. The non-susceptible type of wax when reacted with aluminum chloride or other halides, such as hydrochloric acid, or certain Friedel-Crafts catalysts, becomes oxidation susceptible. The above aluminum chloride treatment was accomplished by heating for approximately 7 hours at 100° C. The amount of aluminum chloride used was 10%. Lesser amounts can be used. Such treatment has been described in the patent literature.

The present invention is concerned with the use of oxidation susceptible microcrystalline waxes derived from tank bottoms and preferably the oxidation susceptible microcrystalline waxes from tank bottoms as found in the East Texas oil fields. As has been pointed out it is not known whether oxidation is prevented by the presence of a naturally occurring anti-oxidant or whether some other cause is involved. In some instances non-oxidation susceptible waxes, particularly of the kind derived from West Texas, can be rendered oxidation susceptible by vigorous treatment with a metallic chloride which apparently causes some obscure change, the character of which is not known.

As to the treatment of microcrystalline wax with aluminum chloride or the like, see U.S. Patent No. 2,471,102 to Fish.

Having selected an oxidation susceptible wax of the kind above described, it is to be noted for the present purpose it must meet another requirement. Certain microcrystalline waxes derived in the conventional manner apparently mix with a large variety of olefin polymers at their melting point or somewhat above, for instance, 160° C. For instance, one such polymer is polystyrene. We have used the lowest molecular weight of polystyrene available from a commercial source as a screening test to select the appropriate tank bottom wax. Our method of screening is as follows: We mix 5 grams of polystyrene (5000 or 10,000 molecular weight) with 95 grams of microcrystalline wax and if after stirring for 4 hours at 160° C. one does not obtain a homogeneous mixture the wax is satisfactory for use in the present invention. If one does obtain a homogeneous mixture the wax is not suitable for the present invention.

Reference has been made to pre-treatment with a metallic salt, particularly a metallic halide such as, for example, aluminum chloride. Chlorinated hydrocarbons and particularly chlorinated paraffin has been suggested for this purpose. Hydrochloric acid is sometimes satisfactory for the same purpose.

In the hereto appended claims the wax employed is characterized by the following characteristics: (a) oxidation susceptible in a conventional procedure; (b) immiscible with polystyrene 5000 or 10,000 molecular weight at approximately 160° C., and (c) has not been subjected to treatment with a metallic halide, hydrochloric acid or a chlorine containing hydrocarbon compound.

The present invention includes the use of a polyethylene. Polyethylenes cover a variety of products running in molecular weights from 1,000 to almost 100,000. The bulk of those sold in commerce range from 15,000 to 25,000 molecular weight. There are certain low molal polyethylenes having a molecular weight in the range of 1,000 to 5,000. Although a number of these have been prepared in the present invention we prefer to use the type described in U.S. Patent No. 2,504,400, dated April 18, 1950, to Erchak. Said patent characterizes the product in terms of the method of manufacture which is a process for the production of at least medium hard, high-melting waxes from ethylene which comprises maintaining ethylene under pressures between about 425 and 475 atmospheres and at temperatures between about 140° C. and 200° C. in contact with isopropanol in amount sufficient to occupy from about 5% to about 10% of the total volume of the reaction zone and containing from about 0.1 to about 2% by weight on the isopropanol of hydrogen peroxide on a 100% hydrogen peroxide basis.

The peculiar characteristics of low molal hydroxylated polyethylene have been recognized and the particular type of material herein employed is one of the components of reactants also as described in U.S. Patent No. 2,698,309 dated December 28, 1954, to Thwaites et al. For instance, in the last mentioned patent a product is identified as a wax composition comprising paraffin wax containing from 0.5 to 10% by weight of a mixture of polyethylene and 40 to 60% by weight based on total polymer of polyethylene having a terminal hydroxyl group, said hydroxylated polyethylene being produced by polymerizing ethylene under 425–475 atmospheres at temperatures between 140° and 200° C. in the presence of isopropanol and hydrogen peroxide.

For purpose of convenience, what is said hereinafter will be divided into six parts:

Part 1 is concerned with suitable tank bottom derived microcrystalline wax;

Part 2 is concerned with the conventional high molal polyethylene;

Part 3 is concerned with the hydroxylated low molal polyethylene employed;

Part 4 is concerned with the limits of the components in the mixtures employed;

Part 5 is concerned with gaseous oxidation of the mixture and for convenience is divided into two sections; Section A is concerned with operative steps as the procedure is actually conducted, and Section B is concerned with the consideration of the probable reactions involved; and Part 6 is concerned with uses for the products derived in the manner described in Part 5, preceding.

PART 1

The paraffin wax employed in the present invention is characterized by being obtained from tank bottoms in the conventional manner. The procedure for recovery of such waxes is well known and materials are presently supplied commercially by at least three organizations. As has been pointed out elsewhere such waxes may or may not be oxidation susceptible by conventional gaseous oxidation procedure.

The tank bottom wax employed for the present purpose must be naturally oxidation susceptible, i.e., must not require treatment with some chemical compound such as aluminum chloride, hydrochloric acid, chlorinated paraffin, or the like, to render it oxidation susceptible. Generally speaking, the melting point of such waxes prior to oxidation is within the range of 150° to 200° F. The preferred range for the present purpose is a wax that melts at approximately within the range of 190° to 195° F. The color may vary from a pale straw to dark amber. Our preference is to use the lighter colored waxes such as would approximate pale amber, yellow, or straw, in color.

PART 2

High molal polyethylenes within the molecular weight range of 17,000 to 32,000 are marketed by a number of organizations and have been fully described in the literature. The various high molal polyethylenes may vary somewhat in respect to hardness, softening point, etc. The variation is largely one of physical properties from a standpoint of molding polyethylene which is its most important use. There is no evidence that high molal polyethylene includes either a hydroxyl group or a carboxyl group in the molecule or if it does it is not detectible by the usual methods of examination. It is well known that in numerous cases such high molal polyethylenes do contain a trace of oxygen although the manner in which the oxygen is combined is not completely understood.

Figure 4:
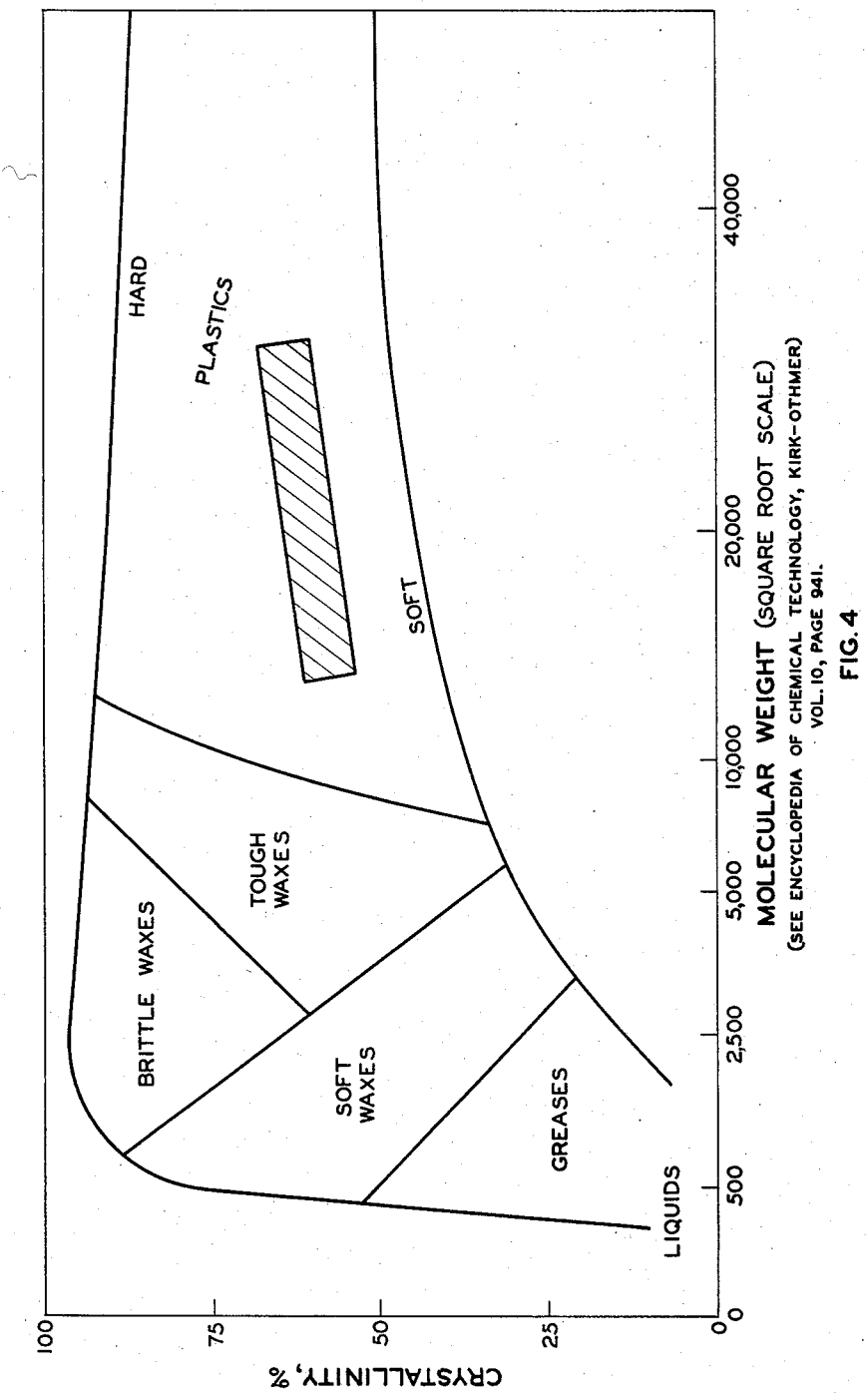

As to a more complete description of these polyethylenes suitable for the present purpose, reference is made to Kirk-Othmer, Encyclopedia of Chemical Technology, volume 10, page 938 et seq. Note the following statement which appears on page 940:

"A number of physical and mechanical properties are directly affected by the crystallinity and hence by the degree of branching. Examples are hardness, softening point, and yield point in tension. On the other hand, some properties, such as tensile strength, flexibility at low temperatures, and impact strength are principally a function of the average molecular weight. The wide range of types of polyethylene is a reflection of the wide variation in molecular weight and in degree of branching, and hence in crystallinity, which can be covered by alterations in the polymerization conditions. The interrelation of chain length crystallinity, and the nature of the polymer is shown in (Figure 4 hereto attached). The normal commercial polyethylenes, whose properties are described in the subsequent sections, lie within the small shaded band in the center of the diagram."

In light of the above it seems the clearest description of the polyethylene of the kind herein described is by reference to the shaded band or rectangular area of Figure 4 which, as previously stated, is the Figure 1 referred to in the excerpt above.

PART 3

Such low molal polyethylenes having one hydroxyl and in all likelihood in the terminal position have been produced by various methods. One method of production is that described in aforementioned U.S. Patent No. 2,504,400. This type of polyethylene has been used for various purposes as illustrated by aforementioned U.S. Patent No. 2,698,309.

As has been pointed out previously, the appended claims include the same terminology for purpose of identification as appear in the claims of U.S. Patent No. 2,698,309.

Referring to Figure 4 it is obvious that the molecular weight of approximately 2100 (without differentiating the area as to soft waxes or brittle waxes, or a combination) is completely removed from the area of the shaded rectangle which characterizes the normal high molal polyethylenes.

PART 4

As has been pointed out elsewhere the peculiar properties exhibited by the herein described products which typify the invention cannot be obtained by mixing the three raw materials or reactants in any proportion. The proportions employed come within specific limits which have been set forth in Figure 1. Examples of typical mixtures which can be subjected to oxidation in the manner described in Part 5 subsequently, are as follows:

*Example 1a*

To 300 grams of microcrystalline wax (190-195° F. melting point) obtained by refining the tank bottom residue from preferably East Texas crudes, is added 68 grams of high molal polyethylene (average molecular weight approximately 20,000) and 32 grams of a low molal hydroxyl polyethylene (average molecular weight 2,100). The resultant mixture is heated to approximately 320° F. for 2 hours at which time a homogeneous blend is obtained. When a portion of this material is allowed to cool to room temperature there appears to be no separation of any of the constituent materials. This material is very hard and forms firm hard gels in turpentine, mineral spirits and other hydrocarbon solvents.

*Example 2a*

To 256 grams of microcrystalline wax (190-195° F. melting point) is added 96 grams of high molal polyethylene (average molecular weight approximately 22,000) and 48 grams of low molal hydroxy polyethylene (average molecular weight 2,100). The resultant mixture is heated to approximately 320° F. for 2 hours at which time a homogeneous mixture is obtained which shows no separation of constituents, when cooled down. In this and other examples these materials can be blended at a lower temperature, for instance, 280° F. and lower but it will take a longer time to effect solution. At a higher temperature, for example, 350° F. solution can be effected in a shorter time with possibly some breakdown in the polymer chain.

*Example 3a*

To 288 grams of a microcrystalline wax (190-195° F. melting point) is added 64 grams of a high molal polyethylene (average molecular weight approximately 18,000) and 48 grams of a low molal polyethylene (average molecular weight of approximately 2100). The resultant mixture is heated to approximately 320° F. for 2 hours at which time a homogeneous mixture is obtained which shows no separation of constituents when cooled down to room temperature.

*Example 4a*

To 272 grams of a microcrystalline wax (190-195° F. melting point) is added 96 grams of a high molal polyethylene (average molecular weight approximately 19,000) and 32 grams of a low molal polyethylene (average molecular weight approximately 2100). The resultant mixture is heated to approximately 320° F. for 2 hours, at which time a homogenous mixture is obtained which shows no separation of constituents when cooled down to room temperature.

*Example 5a*

To 296 grams of a microcrystalline wax (170-175° F. melting point) is added 68 grams of a high molal polyethylene (average molecular weight approximately 30,000) and 36 grams of a low molal polyethylene (average molecular weight approximately 2100). The resultant mixture is heated to about 320° F. for 2 hours at which time a homogeneous mixture is obtained which shows no separation of constituents when cooled down to room temperature.

*Example 6a*

To 280 grams of a microcrystalline wax (190-195° F. melting point) is added 80 grams of a high molal polyethylene (average molecular weight approximately 14,000) and 40 grams of a low molal polyethylene (average molecular weight approximately 2100). The resultant mixture is heated to about 320° F. for 2 hours at which time a homogeneous mixture is obtained which shows no separation of constituents when cooled down to room temperature.

*Example 7a*

To 280 grams of a microcrystalline wax (185-190° F. melting point) is added 76 grams of a high molal polyethylene (average molecular weight approximately 25,000) and 44 grams of a low molal polyethylene (average molecular weight approximately 2100). The resultant product is heated to approximately 320° F. for 2 hours at which time a homogeneous mixture is obtained which shows no separation of constituents when cooled down to room temperature.

*Example 8a*

To 264 grams of a microcrystalline wax (190-195° F. melting point) is added 88 grams of a high molal polyethylene (average molecular weight approximately 17,000) and 48 grams of a low molal polyethylene (average molecular weight approximately 2100). The resultant mixture is heated to approximately 320° F. for 2 hours at which time a homogeneous mixture is obtained which shows no separation of constituents when cooled down to room temperature.

PART 5

This part is concerned with the gaseous oxidation of mixtures which have been described in Part 4, preceding. This part will be divided into two sections, Section A dealing with illustrative examples and Section B concerned with the possible reactions which are involved,

SECTION A

Example 1b

To the product of Example 1a is added 2 grams of cobalt naphthenate. The resultant mixture is blown with air at a rate of 5 ml./g./min. until the product shows an acid number of 16. This latter step requires normally about 65 hours but this lengthy time can be considerably reduced by the use of oxygen enriched air or pure oxygen. The product of this example is a light orange color, is easily emulsifiable and has a penetration of 2 as measured by the procedure outlined by the A.S.T.M. Test Method D5–25, using a 100 g. weight and a temperature of 25° C.

Example 2b

To the product obtained from Example 2a is added 2 grams of manganese naphthenate. The mixture is heated to 270° F. and air is blown through at a rate of 5 ml./g./min., maintaining the temperature at 260°–280° F., until an acid number of about 25 is obtained. The average time required is about 75 hours. It has been found that it is not necessary to add all the polyethylene before the air is turned on and in fact it is often of advantage when higher percentages of polyethylene are used, especially of the high molal type, to add part of it after the oxidation has progressed for, say 8 hours.

The same product is obtained using a wax-insoluble catalyst such as potassium permanganate (introduced as an aqueous solution) instead of the manganese naphthenate. The product of this example is an orange color and is very hard, having a penetration value of between one and two as measured by the A.S.T.M. Test Method D5–25. It has a saponification number of between 60 and 75 and may be easily emulsified by the procedure described in Part 6 of this application to give a stable emulsion in water, which emulsion upon drying, will give a hard, tough and glossy film.

Example 3b

To the product from Example 3a is added 2 grams of manganese stearate. After this mixture is heated to 300° F., air is introduced at a rate of approximately 5 ml./g./min., until an acid number of about 10 is obtained (about 40 hours). The temperature is then reduced to 240–250° F. and the oxidation is continued until the acid number reaches approximately 17 (about 15 hours). By the use of this procedure a light orange, hard, emulsifiable wax is obtained having a saponification value of 45–55. If this oxidation reaction is run at a temperature of 260–280° F. rather than starting the oxidation at a higher temperature and then lowering it, a product is obtained having a lower saponification to acid number ratio. Although this latter product can be emulsified to give a stable emulsion with very desirable properties, a wax having a higher saponification to acid number ratio may be more easily emulsified with water.

Example 4b

When the procedure of Example 2b is employed using the product from Example 4a with 2 grams of manganese naphthenate, an orange colored product is obtained that has a penetration of one as measured by the A.S.T.M. Test Method D5–25 when it has been oxidized to an acid number of 15 and a saponification number of between 35–45. The time required for this reaction is from 60 to 75 hours.

SECTION B

The present invention is concerned with the resultant obtained by reactions of the kind specified in regard to a tertiary mixture, one component being tank bottom-derived microcrystalline waxes and preferably derived from East Texas crude along with two different polyethylenes. There are a number of suitable references which indicate as far as the oxidizing of tank bottom waxes goes, when oxidation takes place under conditions herein described that there is considerable change as, for example, conversion so the product shows an acid number of 30, a saponification number of 90, along with a combined oxygen content of approximately 5%. Obviously there are formed alcohols, and then acids and then esters, although this is an oversimplification which does not take into consideration other products which might be formed. For instance, reference is made to U.S. Patent No. 2,128,523, dated August 30, 1938, to Burwell. In discussing the oxidation of waxes under conditions akin to those herein employed with certain modifications there is stated the following "The process above described is that disclosed in Patent Nos. 1,690,768 and 1,690,769, granted to Arthur W. Burwell. The resulting reaction product is a mixture of a great number of different compounds which may, for clarity, be grouped thus:

(1) Unoxidized (i. e., 'original') hydrocarbons;
(2) Aliphatic alcohols, largely secondary and tertiary;
(3) Aliphatic ketones;
(4) Keto-alcohols;
(5) High molecular weight saturated aliphatic carboxylic and hydroxycarboxylic acids; etc.; and
(6) Neutral esters and lactones derived from the aforesaid acids and the aforesaid alcohols, or from the aforesaid acids, respectively.

"Differently grouped, the mixtures are separable broadly into (a) saponifiables and (b) unsaponifiables: into the latter group fall the alcoholic and ketonic compounds aforesaid (and, of course, the unoxidized hydrocarbons), whereas the acids, esters and lactones are grouped as saponifiables."

Normally in the oxidation of conventional polyethylene particularly polyethylene having a molecular weight in excess of 12,000 and most characteristically a polyethylene of the kind that is commonly used in wax compounds, such as polyethylene of the 12,000 to 32,000 molecular weight range, one finds that the same reactions take place along with other reactions, to wit, polymerization, extensive oxidative degradation or depolymerization or the equivalent. We are inclined to think that the initial attack occurs at a tertiary or secondary position so as to eventually form alcohols and then these are further oxidized with rupture of the polyethylene molecule to form acids or other oxidation products which may again be further degraded by similar means. In other words, in oxidation of a polyethylene having a molecular weight in the 12,000 to 32,000 range, there is no question but what in the final stages, and perhaps after considerable change in color, one does obtain products in which, to a large extent and perhaps entirely, the initial structural units represent products having a molecular weight in the neighborhood of 4,000, 3,000 or 2,000, or less, i. e., the polyethylene unit seems to be degraded into a number of smaller molecules.

Figure 2:
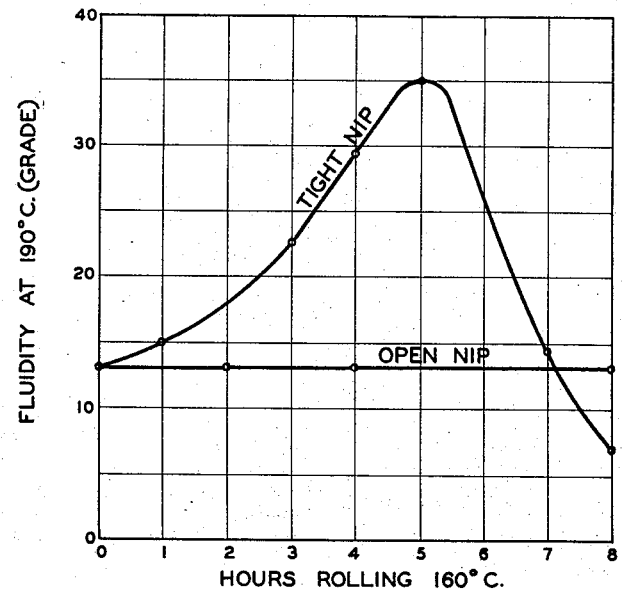
Figure 3:
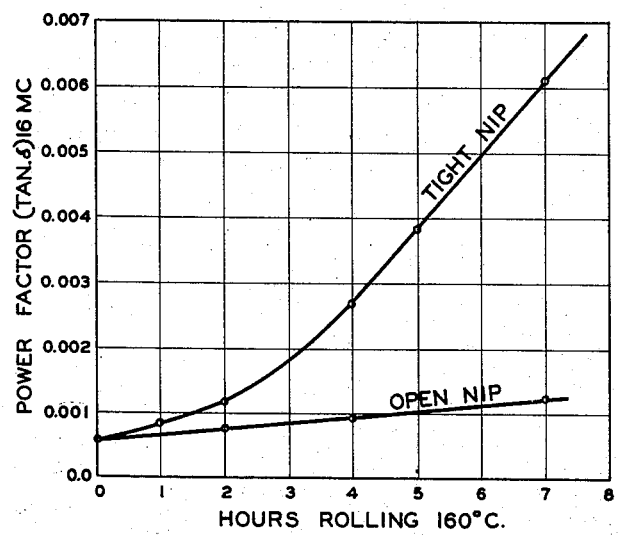

As to the oxidation of polyethylene reference is made to Midwinter, British Plastics, May 1945, pp. 208–214 and 228. For purpose of convenience, two drawings appearing in the article are herewith produced as Figures 2 and 3. As stated in the article, the figures herein identified as 2 and 3 show the effect of milling polyethylene in air at 160° C. Both power factor and fluidity show very marked changes when polyethylene is rolled with a tight nip and constantly changing surface (good mixing), but no appreciable differences are noted when polyethylene is rolled with an open nip so that the movement of the bank between the rolls is reduced to a minimum (poor mixing).

Reference is made to the pamphlet "Alkathene" which is the brand of polyethylene marketed by the Plastics Division of Imperial Chemical Industries Limited. The reference to Alkathene has no significance other than that it is a reference to a polyethylene of the conventional type having molecular weight range from approximately 12,000 to 32,000. The statement is as follows:

"When 'Alkathene' is processed in air below 125° C. for periods up to about eight hours, its physical and electrical properties are scarcely affected, but at higher temperatures, or after a longer time, oxidation occurs.

"Oxidation causes an increase of power factor and an increase or decrease in fluidity, sometimes accompanied by discoloration. Thus, heating in limited amounts of oxygen causes cross-linking of polymer molecules and, therefore, a toughening of the product to a rubber-like mass. On the other hand, having in excess oxygen involves molecular degradation and a decrease in melt viscosity.

"In mill mixing the rate of oxidation increased with increase in the temperature and the rate of shear in the nip."

It is very questionable that oxidation as herein conducted on a binary mixture of tank bottom-derived wax and high molal polyethylene would produce a composite in which there were comparatively small units having 50 to 75 carbon atoms derived from the wax and large units having perhaps 1200 carbon atoms derived from the polyethylene. This does not mean that trans-esterification or esterification could not take place, at least theoretically, between the acids of the wax and the alcohols of the high polymer molecule; or, inversely, between the acids of the high molal polyethylene and the alcohols of the low molal wax but there is the reaction which probably takes place at an intermediate point, to wit, the break down or cleavage of the polyethylene (probably after hydroxylation) and thus a mixture if one proceeded as herein described omitting the low molal polyethylene (the polyethylene having a molecular weight of 2000 or thereabouts) would actually result, at least to a substantial degree and perhaps entirely in mixed esters derived from the low molal wax and the polyethylene obtained by oxidative degradation or depolymerization, i. e., degradation polymer units having a molecular weight in the neighborhood of 2,000 to 4,000.

When a three-component system, to wit, a tank-bottom refined wax, a high molal polyethylene and a low molal polyethylene, is subjected to oxidation conditions we obtain a product which has more desirable properties than that obtained from the binary system just beforehand mentioned. Although it is a matter of speculation it is felt that the difference herein noted in the oxidation is due to the terminal hydroxyl groups which are probably present in the low molal polyethylene and which are probably not formed in the oxidation of wax or polyethylene due to the nature of oxidation so as to give rise to oxidation derivatives in which carbon atoms near the center of the chain are attached. These alcohols can be oxidized to acids and thence converted to esters without chain cleavage. Any low molal polyethylene molecule containing terminal unsaturation would yield long chain acids with minimum chain cleavage. Perhaps herein lies the unique nature of the low molal polyethylene.

The products herein obtained as far as we are aware involve a procedure not suggested previously elsewhere. Emphasis appears to be indicated in regard to what has been just said, not so much from the standpoint of differentiating from other processes, but rather to offer some explanation, whether logical or speculative, as to why the herein described procedure gives products of unusual value for numerous purposes. The reason for this is the following: (a) We use two different polyethylenes, one being high molal and one low molal; (b) as far as we know no one has suggested previously the oxidation of a polyethylene having a molecular weight of 2000 or thereabouts alone, and particularly a hydroxylated polyethylene; (c) over and above this the total amount of polyethylene employed is not such small amount or small ratio as is sometimes employed but is a substantial amount, for instance, approximately one-quarter as much or more of the amount of wax employed; (d) we do not find we can replace the polyethylene with other polymers, such as vinyl polymers, butadiene polymers, butylene polymers, or the like—the properties obtained seem to be obtainable from polyethylene only; (e) desirable properties of the kind hereinafter described seem to be limited to an extremely narrow combination, i.e., the initial reaction mixture which comes within the area of the parallelogram in Figure 1; (f) finally, so far as we are aware no such combination as specified above has been subjected, not merely to bare oxidation or minimum oxidation but to controlled oxidation so as to obtain a final product having an acid number at least 12, a saponification number of at least 35, and combined oxygen content of not less than 2%. The upper limit for the acid number is approximately 35; for the saponification number approximately 90; and for the combined oxygen content approximately 7%.

Numerous catalysts may be successfully employed in this invention to effect oxidation. In general these catalyst are composed of salts of the transition metals and, more specifically, salts of cobalt, manganese and iron. We prefer to use wax soluble catalysts of these elements, such as the naphthenate, stearate, oleate, etc. Another very effective catalyst is potassium permanganate. This material is wax insoluble and it is best to add it in the form of an aqueous solution and then allow the water to evaporate from the wax mixture.

The mixture composed of microcrystalline wax, high molecular weight polyethylene and hydroxy low molecular weight polyethylene is oxidized by an oxygen-containing gas in this invention. We normally employ air because of convenience. However, oxygen, or air enriched with oxygen, will give a gas which would would work equally as well. We have noted that when a gas high in oxygen content is employed, the oxidation proceeds at a much more rapid rate and as a result a lower gas rate can be employed. Ozone can be added to the oxygen-containing gases which aids in the oxidation procedure.

What is said herein as to the initial component mixtures which is subjected to drastic oxidation it may be noted that such mixture can be combined with small amounts of certain other wax-soluble polymers mentioned elsewhere, such as paracoumarone resin, indene resin, terpene resin, or the like, to give analogous products. Note that in such instance neither type of polyethylene (high molal or low molal) can be replaced by some other polymer but some other polymer in comparatively small amounts, for instance, ¼% up to 5% may be added and at least in some instances give somewhat modified properties. Such four-component combination is not part of the present invention.

Similarly, another four-component combination, which is not part of the present invention, involves the use of a polybutylene and particularly one which is a solid at ordinary room temperatures. Such solid polybutylene have either one or both of two characteristics, i.e., a stickiness or tackiness and, secondary a rubbery body. Actually, we have prepared products using a four-component system, i.e., those above enumerated along with solid polybutylene in small amounts, for instance, 1% to 5% by weight of the total mix and the resultant product gives excellent floor polishes which, in addition to the usual desirable qualities was particularly valuable from the standpoint that it seemed to be slip-proof.

PART 6

The products of this invention have many uses, but they are especially valuable for the preparation of emulsions which, when spread on a surface, leave a hard tough film having a high gloss.

These aqueous emulsions may be made by various methods, e.g., wax to water, water to wax, etc., employing numerous emulsifying agents. One suitable procedure is as follows:

*Example 1c*

100 grams of an oxidized product of this invention and 12 grams of oleic acid are blended with agitation and to this blend at 200–205° F. are added 7.6 grams of morpholine. Water at 200–210° F. is at first added very slowly to the above blend kept at 200–210° F. First a heavy gel forms which inverts to the oil-in-water type of emulsion and at this time the rate of water addition can be increased. To make an emulsion containing 12% solids, 816 grams of water should be used in this procedure. To this emulsion should be added 5% to 10% of a 12% ammoniacal shellac solution (or a comparable material) to improve the leveling properties of the emulsion.

It may be necessary to vary the proportions of the emulsifying agents depending upon to what extent the polyethylene wax blends are oxidized. This emulsion also can be made by the wax-to-water method although the resultant emulsion is not as good.

In addition, various other ingredients may be used in these emulsions as synthetic resins, such as those obtainable on the open market and recognized for this use by the trade, or various vegetable waxes.

*Example 2c*

25 grams of the product of this invention, 25 grams of an oxidized microcrystalline wax produced by several manufacturers (180–185° F. melting point, 4–6 penetration, 4–5 N.P.A. color, 20–25 acid number, and 55–65 saponification number, 25 grams of a phenol-terpene resin of the type used by floor polish manufacturers, 25 grams of carnauba wax and 10 grams of oleic acid, are heated together at temperatures up to 250° F. until a solution is obtained. The mixture is cooled to 210° F. with agitation. 7.2 grams of 2-amino-2-methyl-1-propanol are added with stirring at 200° to 210° F., followed immediately by addition of 4 grams of borax in a saturated solution. This mixture is heated at 200° to 210° F. for five minutes and then the melt is slowly poured into water at 200° to 210° F. with rapid agitation. When the emulsion has smoothed out a 12% solution of leveling agent is added with agitation.

These finished emulsions can be spread on a surface such as linoleum, to give a finish which dries to a high gloss without buffing. This wax film is hard and tough and as a result is resistant to scuffing.

The wax products of the invention may be used in other emulsions such as those used for furniture or automobile polishes to give hard glossy films.

Because of the high melting point and good hardness of the products of this patent application these waxes are also valuable for additives to other waxes to impart to varying extents these desirable characteristics.

These wax materials also find use as additives to lubricating greases or as additives in various hydrocarbon coatings for metal where, in addition to enhancing the physical properties, they also have a tendency to inhibit corrosion.

The percentage of oxygen as reported in the invention is best determined by a carbon and hydrogen analysis. Since these oxidized materials are essentially composed of carbon, hydrogen and oxygen, the percentage of oxygen is equal to 100% minus the sum of the percent of carbon and hydrogen. There will be, of course, a trace of other materials such as that contributed by the metal catalyst (approximately 0.03%), metals from the reaction vessel (these contribute less than 0.01%) and other elements such as nitrogen and sulfur (usually less than 0.01%). An approximate value for the percentage of oxygen can be calculated by using the saponification number, hydroxyl value, and carbonyl value. Most of the oxygen is in the form of acids and esters, so an idea of the oxygen content can be determined from the saponification value.

Having thus described our invention, what we claim as new and desire to obtain by Letters Patent, is:

1. The process of oxidizing a three-component mixture consisting of (A) refined tank bottom-derived microcrystalline wax having a carbon atom range of approximately 35 to 100; said wax being characterized by the following characteristics; (aa) oxidation susceptible in conventional gaseous oxygen-containing oxidation procedure; (bb) immiscible with polystyrene of molecular weight range 5,000 to 10,000 at approximately 160° C., and (cc) has not been rendered oxidation susceptible by subjecting to treatment with a member of the class consisting of a metallic halide, hydrochloric acid and chlorinated hydrocarbon; (B) a low molal polyethylene having a molecular weight of approximately 2,100; said polyethylene having a terminal hydroxyl group, said hydroxylated polyethylene being produced by polymerizing ethylene under 425–475 atmospheres at temperatures between 140° and 200° C. in the presence of isopropanol and hydrogen peroxide; and (C) a normal commercial polyethylene defined by the small shaded rectangular band of Figure 4; in said weight proportions so that the average composition of said initial reactants lies approximately within the parallelogram A, B, C, D, of the accompanying drawing, Figure 1; said oxidation comprising oxidizing with an oxygen-containing gas in presence of not over 2% of a conventional oxidation-promoting catalyst at a temperature above 212° F. within the range of about 240° F. to 300° F. for a period of time of about 55 to about 75 hours in gas flow rate to cause formation of (a) hydroxyl containing molecules; (b) carboxyl containing molecules; followed by (c) esterification, and (d) subsequent reactions including at least one of the following, alcoholysis and ester-interchange; said resultant product having an acid number of not less than 12, and a saponification number of not less than 35, and having a combined oxygen content of not less than 2%.

2. The product obtained by the process defined in claim 1.

3. The process of oxidizing a three-component mixture consisting of (A) refined tank bottom-derived microcrystalline wax having a carbon atom range of approximately 35 to 100; said wax being characterized by the following characteristics; (aa) oxidation-susceptible in conventional gaseous oxygen-containing oxidation procedure; (bb) immiscible with polystyrene of molecular weight range 5,000 to 10,000 at approximately 160° C., and (cc) has not been rendered oxidation susceptible by subjecting to treatment with a member of the class consisting of a metallic halide, hydrochloric acid and chlorinated hydrocarbon; (B) a low molal polyethylene having a molecular weight of approximately 2,100; said polyethylene having terminal hydroxyl group, said hydroxylated polyethylene being produced by polymerizing ethylene under 425–475 atmospheres at temperatures between 140° and 200° C. in the presence of isopropanol and hydrogen peroxide; and (C) a normal commercial polyethylene defined by the small shaded rectangular band of Figure 4; in such weight proportions so that the average composition of said initial reactants lies approximately within the parallelogram A, B, C, D, of the accompanying drawing, Figure 1; said oxidation comprising oxidizing with an oxygen-containing gas in presence of not over 2% of a conventional oxidation-promoting catalyst at a temperature above 212° F. within the range of about 240° F. to 300° F for a period of time of about 55 to about 75 hours in gas flow rate to cause formation of (a) hydroxyl containing molecules; (b) carboxyl containing molecules; followed by (c) esterification, and (d) subsequent reactions including at least one of the following, alcoholysis and ester-interchange; said resultant product having an acid number of not less than 12, and not over 35; and a saponification number of not less than 35 and not over 90; and having a combined oxygen content of not less than 2% and not over 7%.

4. The product obtained by the process defined in claim 3.

5. The process of claim 3 with the proviso that the oxidation catalyst be a member selected from the class consisting of a wax soluble organic salt of cobalt, a wax soluble organic salt of manganese and potassium permanganate, and with the further proviso that the amount of said catalyst be not over 1% by weight of the oxidation susceptible mixture.

6. The product obtained by the process defined in claim 5.

7. The process of oxidizing a three-component mixture consisting of (A) refined tank bottom-derived microcrystalline wax having a carbon atom range of approximately 35 to 100; said wax being characterized by the following characteristics; (aa) oxidation-susceptible in conventional gaseous oxygen-containing oxidation procedure; (bb) immiscible with polystyrene of molecular weight range 5,000 to 10,000 at approximately 160° C., and (cc) has not been rendered oxidation susceptible by subjecting to treatment with a member of the class consisting of a metallic halide, hydrochloric acid and chlorinated hydrocarbon; (B) a low molal polyethylene having a molecular weight of approximately 2,100; said polyethylene having a terminal hydroxyl group, said hydroxylated polyethylene being produced by polymerizing ethylene under 425–475 atmospheres at temperatures between 140° and 200° C. in the presence of isopropanol and hydrogen peroxide; and (C) a normal commercial polyethylene defined by the small shaded rectangular band of Figure 4; in such weight proportions so that the average composition of said initial reactants lies approximately within the parallelogram A, B, C, D of the accompanying drawing, Figure 1; said oxidation comprising oxidizing with air in presence of not over 1% of a member selected from the class consisting of cobalt naphthenate, and manganese naphthenate at a temperature above 212° F within the range of about 240° F. to 300° F. for a period of time of about 55 to about 75 hours in gas flow rate to cause formation of (a) hydroxyl containing molecules; (b) carboxyl containing molecules; followed by (c) esterification and (d) subsequent reactions including at least one of the following, alcoholysis and ester-interchange; said resultant product having an acid number of not less than 12, and not over 35; and a saponification number of not less than 35, and not over 90; and having a combined oxygen content of not less than 2% and not over 7%.

8. The product obtained by the process defined in claim 7.

References Cited in the file of this patent

UNITED STATES PATENTS

| | | |
|---|---|---|
| 2,426,248 | Sugarman | Aug. 26, 1947 |
| 2,471,102 | Fish | May 24, 1949 |
| 2,504,400 | Erchak | Apr. 18, 1950 |
| 2,601,109 | Fish | June 17, 1952 |
| 2,698,309 | Thwaites et al. | Dec. 28, 1954 |
| 2,754,278 | Wilson et al. | July 10, 1956 |

FOREIGN PATENTS

| | | |
|---|---|---|
| 581,279 | Great Britain | Oct. 7, 1946 |